(12) United States Patent
Demazeau et al.

(10) Patent No.: US 11,157,501 B2
(45) Date of Patent: Oct. 26, 2021

(54) DATABASE CACHING

(71) Applicant: AMADEUS S.A.S., Biot (FR)

(72) Inventors: Michel Demazeau, Nice (FR); Celine Soubra, Antibes (FR); Jean-Philippe Perret, Saint Jeannet (FR); Marco Salibba, Nice (FR); Jacques Bonaud, Cagnes sur Mer (FR)

(73) Assignee: AMADEUS S.A.S., Biot (FR)

( * ) Notice: Subject to any disclaimer, the term of this patent is extended or adjusted under 35 U.S.C. 154(b) by 437 days.

(21) Appl. No.: 16/409,318

(22) Filed: May 10, 2019

(65) Prior Publication Data

US 2019/0354528 A1  Nov. 21, 2019

(30) Foreign Application Priority Data

May 17, 2018 (FR) .................................. 18 54120

(51) Int. Cl.
*G06F 16/2455* (2019.01)
*G06F 16/23* (2019.01)
(52) U.S. Cl.
CPC .... *G06F 16/24552* (2019.01); *G06F 16/2365* (2019.01)
(58) Field of Classification Search
None
See application file for complete search history.

(56) References Cited

U.S. PATENT DOCUMENTS

| 11,048,765 | B1* | 6/2021 | Paiz ...................... G06F 16/335 |
| 2010/0036805 | A1 | 2/2010 | Blamer et al. |
| 2013/0317884 | A1 | 11/2013 | Chidlovskii |
| 2014/0032113 | A1 | 1/2014 | Nesbitt |
| 2016/0042278 | A1* | 2/2016 | Baughman .......... H04L 67/2842 706/52 |
| 2018/0096001 | A1* | 4/2018 | Soza ..................... G06F 16/235 |

FOREIGN PATENT DOCUMENTS

| EP | 2911070 A1 | 8/2015 |
| WO | 2011160687 A1 | 12/2011 |

OTHER PUBLICATIONS

Ehcache, "Caching Empty Values", retrieved from the internet on Sep. 21, 2017 at http://www.ehcache.org/documentation/2.8/recipes/cachenull.html.

(Continued)

*Primary Examiner* — Amresh Singh
(74) *Attorney, Agent, or Firm* — Thompson Hine LLP

(57) ABSTRACT

Methods, caches, database systems and computer program products for processing database requests and retrieving results from the cache of a database system. The cache stores a representation of a data space of one or more databases of the database system, including one or more results for any database request for which the data space is able to output a result. In response to receiving a database request from a client, the cache determines by utilizing the stored representation whether the data space is able to output one or more results for the database request. If affirmative, one or more results are returned to the client from the representation of the cache. Otherwise, the cache returns an invalidity notification.

19 Claims, 10 Drawing Sheets

(56) References Cited

OTHER PUBLICATIONS

Qiong Luo, Sailesh Krishnamurthy, C. Mohan, Hamid Pirahesh, Honguk Woo, Bruce G. Lindsay, and Jeffrey F. Naughton. 2002. Middle-tier database caching for e-business. In Proceedings of the 2002 ACM SIGMOD international conference on Management of data (SIGMOD '02). ACM, New York, NY, USA, 600-611.

Alexandros Labrinidis, Qiong Luo, Jie Xu and Wenwei Xue (2010), "Caching and Materialization for Web Databases", Foundations and Trends® in Databases: vol. 2: No. 3, pp. 169-266.

National Institute of Industrial Property, Preliminary Search Report and Written Opinion dated Jan. 30, 2019 in French Patent Application No. 1854120.

European Patent Office, European search report issued in Application No. 19174827.6 dated Jun. 7, 2019.

\* cited by examiner

DATABASE CACHING

TECHNICAL FIELD

The present invention relates to database technology and, in particular, to caching database request results.

BACKGROUND

Database caching stores a selection of data which is kept in a database system in a cache. Database requests are then answered from the cache in order to reduce response times. For example, a selection of data frequently requested from the database is stored in the cache. Database requests, for which no data is stored in the cache, are processed at request time and are answered thereafter from the database. Also database requests for which the database does not include any result are processed at request time utilizing processing resources and time of the database system.

SUMMARY

A first aspect is directed to a method for processing database requests to retrieve results (also referred to as data retrieval requests hereinafter) from a cache of a database system. The cache stores a representation of a data space of one or more databases of the database system. The representation includes one or more results for any database request for which the data space of the one or more databases of the database system is able to output a result. The method at the cache determines by utilizing the stored representation, in response to receiving a database request, whether the data space of the one or more databases is able to output one or more results for the database request. If affirmative, one or more results for the database request are returned, otherwise, an invalidity notification is returned.

Another aspect relates to a cache for processing database requests arranged to execute the method of the previous aspects.

Another aspect is directed to a database system including a cache arranged to execute the method of the previous aspects.

Another aspect is directed to a computer program for processing database requests using a cache according to the previously mentioned aspects including code instructions stored on a computer-readable storage medium to execute the before mentioned method, when said program is executed on a computer.

BRIEF DESCRIPTION OF DRAWINGS

The present mechanisms will be described with reference to accompanying figures. Similar reference numbers generally indicate identical or functionally similar elements.

DETAILED DESCRIPTION

Figure 1:
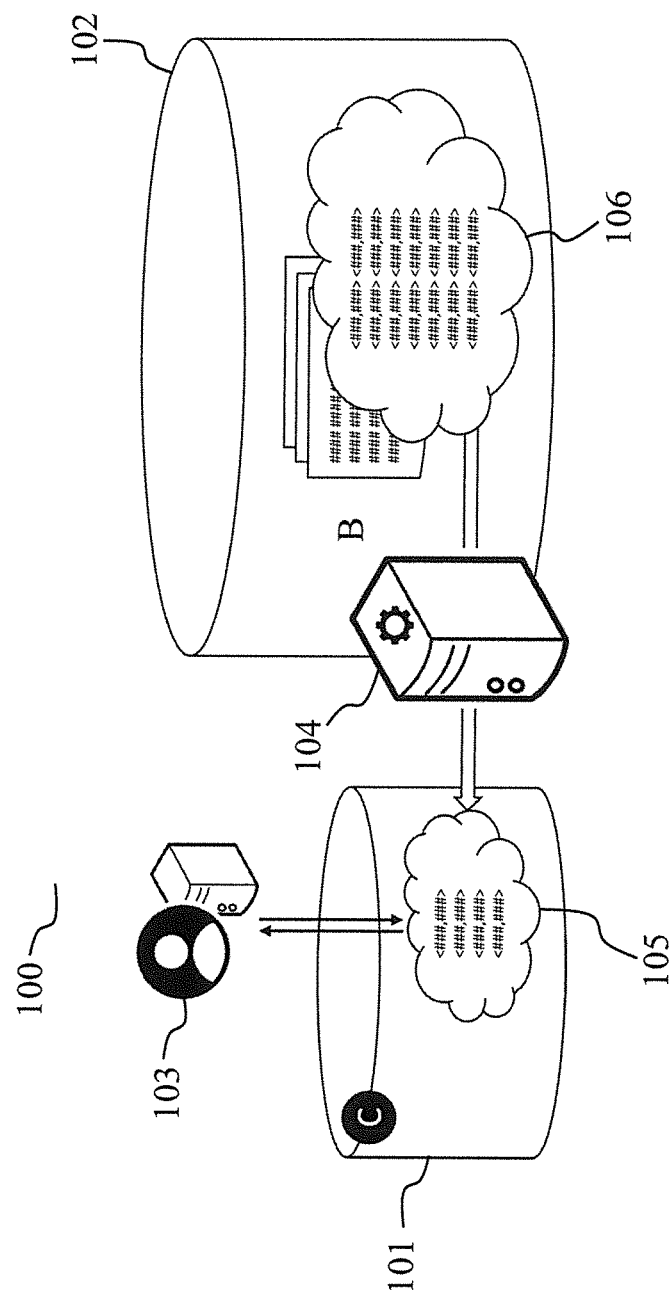
FIG. 1 is an overview of the database system, including a cache and a database.

An overview of a database system 100 including a cache 101 and a database 102 is exemplarily shown in FIG. 1. The database system 100 includes a computing machine 104 including one or more processors for outputting one or more results of processing of data contained in the one or more databases 102, and the data space is able to output the one or more results. The cache 101 is arranged to process database requests received from clients 103. The results are preprocessed by a computing machine 104 in an initialization (thus also referred to as preprocessed results) and/or update of the cache 101. The cache 101 thus stores a representation 105 of a data space 106.

The data space 106 is defined by the data stored in the one or more databases 102 of the database system 100. In other words, the data stored by the at least one database 102 forms the data space 106. The representation 105 includes one or more results for any database request for which the data space 106 of the one or more databases 102 of the database system 100 is able to output a result when the database request is preprocessed on the computing machine 104. The results stored in the cache 101, i.e., the representation 105, are either a transformation of data of the data space 106, and/or a subset of the data space 106. Non-limiting examples of the data space 106 of the at least one database 102 and the representation 105 are given below.

In example embodiments, the at least one database 102 of the database system 100 is a relational database storing data of the data space 106 in tables. In other example embodiments, the database 102 is a noSql (not only Structured Query Language) database storing data of the data space 106 in semi-structured JSON (Java Script Object Notation), XML (Extensible Markup Language) or other documents. However, the embodiments are not restricted to the exemplarily mentioned databases and applicable to any type of database system holding any type of data.

It is noted that, as usual, the one or more databases 102 as described herein store a finite amount of data. For example, in the case of a relational database, the finite amount of data is stored in a given number of database tables. Moreover, as usual, the one or more databases 102 as described herein employ a finite number of types of retrieval operations. For example, in the case of a SQL database, data retrieval request use the SELECT statement indicating one or more database tables and key values. More complex sub-operations such as JOIN may be employed as well. The data retrieval requests may also be limited by defining admissible key values or key value ranges. In any case, given that both the amount of data as well as the types/number of retrieval operations are finite, the representation 105 of the data space 106 as stored by the cache 101 in the way to hold at least one preprocessed result for any data retrieval request for which the data space 106 is able to output a result is finite as well. Non-limiting use-case examples are given further below.

In the example embodiments, clients 103 are machine users such as applications, servers, and/or terminals.

Figure 2:
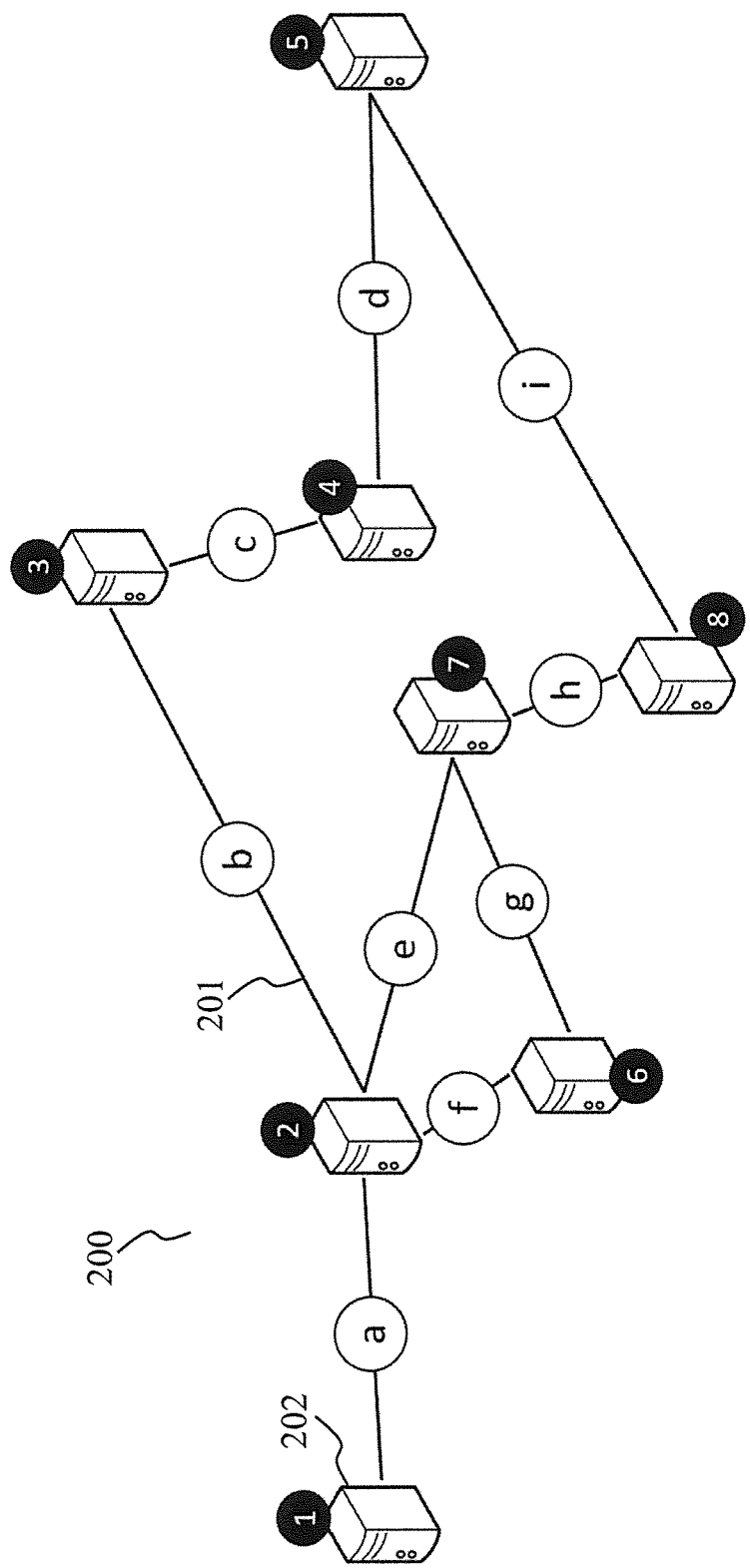
FIG. 2 visualizes an example implementation in a communication network.

In a non-limiting example embodiment, the database system 100 is arranged to answer any database request from clients 103 concerning the availability of routes 201 between servers 202 in a communication network 200 shown in FIG. 2. The database 102 in this example embodiment stores all routes, which are direct connections between two servers without intermediate servers in between. The data space 106 of the database 102 is thus given by the collection of these direct routes between neighboring servers and is able to output all available routes between any pair of servers viz. all permutations of the servers 202 in the communication network 200 also including indirect connections with intermediate servers 202 computed by concatenations of direct routes.

The cache 101 stores a representation 105 of the data space 106, namely a list of all pairs of servers 202 which are connected by a direct route (without intermediate further servers) or indirect route (with intermediate servers). Pairs of servers which are not connected by any route are not part of the representation 105 and are thus not stored in the cache. In other embodiments, the representation 105 includes at least each route for each pair of interconnected servers.

The cache 101 may be initialized (i.e., filled by the representation 105 derived from the data space 106) in various manners. For example, the representation 105 is derived by preprocessing, such as directing database requests to the database 102 and store at least one result retrieved for any request in the cache 101. For example, all data retrieval requests being admissible in the database system 100 may be permutated and directed to the database 102 and at least one result for each request is stored in cache 101. Optionally, duplicates in the cache 101 are avoided in order to minimize memory requirements, i.e., if the representation 105 already includes at least one preprocessed result for a given data retrieval request directed to the database 102 during the initialization phase, no further result is added to the cache for the given data retrieval request.

In the example of a network routes database system, initialization by way of preprocessing may be done by retrieving for each server pair whether or not there is a route between the respective two servers 202. One or more routes 201 for each pair of interconnected servers are preprocessed by the computing machine 104 of the database system 100. The at least one route for each pair of interconnected servers obtained from the data space 106 by the preprocessing form the representation 105 and are stored in the cache 101. Where the preprocessing does not output a route 201 for a pair of servers, this means that the two servers 202 of the pair are not connected by any route and thus no result is stored in the cache 101.

For example, for the pair of servers (1, 2) route "a" is stored in the representation 105 of the cache 101 as a result for a route connecting server 1 and server 2 in the communication network 200. In another example, for the pair of servers (2, 7) route "e" is stored as a result for a route connecting server 2 and server 7. In another example, for the pair of servers (2, 7) routes "e" and "f-g" are stored in the representation 105 of the cache 101 as results for routes connecting server 2 and server 7 in the communication network 200.

Hence, in this example embodiment, the cache 101 stores one route for any database request for pairs of servers 202 in the representation 105 outputted on preprocessing on the computing machine 104. In other example embodiments, the cache 101 stores a number of routes or all routes for any requested pair of servers 202 in the representation 105 outputted on preprocessing on the computing machine 104. In other example embodiments, the cache 101 stores all routes in the representation 105 of the cache 101.

The cache 101 is arranged to determine, by utilizing the stored representation 105, in response to receiving a database request from a client 103, whether the data space 106 of the one or more databases 102 is able to output one or more results for the database request. If affirmative, the cache 101 returns one or more results for the database request stored in the representation 105, otherwise, the cache 101 returns an invalidity notification, because the data space 106 is not able to output a result for this database request.

In the example embodiment in FIG. 2, in response to receiving a database request from a client 103 for a route between server 1 and server 3 in the communication network 200, the cache returns route "a-b" as a result for the database request. In another example embodiment the cache returns routes "a-b", "a-e-h-i-d-c" and "a-f-g-h-i-d-c" as results for the database request of the client 103. In another example embodiment, there is a disconnection in routes "b" and "i", such that the communication network is divided in two disconnected subnetworks. The first of the subnetwork includes the servers 1, 2, 6, 7, 8 and the second subnetwork includes the servers 3, 4, 5. As a consequence, there is no route available between server 1 in the first subnetwork and server 3 in the second subnetwork. In response to receiving a database request from a client 103 for a route between server 1 and server 3, the cache 101 returns an invalidity notification, since the representation 105 of the cache 101 does not store a route for a connection between server 1 and server 3, because the data space 106 is not able to output a route 202 between server 1 and server 3.

In some example embodiments of FIG. 2, results include, in addition to the route, parameters e.g., policies for the availability of the result under given conditions. A result of a network route includes, for example, a parameter indicating that the route or one or more subroutes of the result only is used unidirectional, e.g., route b in FIG. 2 only serves communication in the direction from server 2 to server 3 but not vice versa. Then the only available result for a connection between server 2 and server 3 is route b itself. Route e-h-i-d-c-b is indicated by the unidirectional parameter of b to be not available because it is directed from c to b which is not supported. Both results route b as well as e-h-i-d-c-b may be stored in the cache 101, but are accompanied by the parameter indicating if the route in the respective result is available. In another example, a network route only is available at specific time slots. For example, if servers 3, 4 and 5 belong to another network cluster, then servers 1, 2, 6, 7 and 8 and are only shared at nighttime to support processing by additional resources, routes b and i are restricted to server communication only from 10 pm to 6 am. Therefore, all results including the routes b and/or i as route or subroute include a time parameter indicating when the respective result is available/not available. Other time dependent parameters are, for example, a maximum allowed time for a message to be sent from an origin server to a destination server and/or by a defined time to process a message at an intermediate server on a composed route before it is sent to the next server for further processing. In a third example, the parameter of a result indicates who is qualified to request the result, such that the result is only available to specific sources of the request or users. If another source than indicated in the parameters of a result tries to request the result from the cache 101, the result is not available.

The systems and methods in US 2010/0036805 A1 and US2016/0042278 A1 process a database request in response to receive the database request for the first time and use then a cache to answer the database request from the cache when the request is received again. In response to receiving a database request for the first time, the system has no information about the availability of a result for this database request. Therefore, a database request received for a first time is processed at time of database request, although no result is outputted in the end since the database request was invalid. Where the processing of a database request received for the first time does not output a result, some of the known systems store a NULL in the cache in order to prevent the system to process a database request previously processed not outputting a result again on time of database request. In the contrary, the cache 101 described herein already includes one or more results for any database request for which the data space 106 of the databases 102 of the database system 100 is able to output a result.

Therewith, the cache 101 is able to autonomously answer to any database request without a necessity to refer to the database 102 of the database system 100. Although the database 102 may store more results than the cache 101 for a given data retrieval request, the cache 101 is able to return at least one preprocessed result for the data retrieval request. If the cache 101 does not include any preprocessed result for a given data retrieval request, it is therefore certain already at the cache 101 that the database 102 does not hold any result either. One advantage is therefore that the database system 100 saves any processing load generally caused on invalid database requests related to non-cached data e.g., impossible searches not outputting a result.

Figure 3:
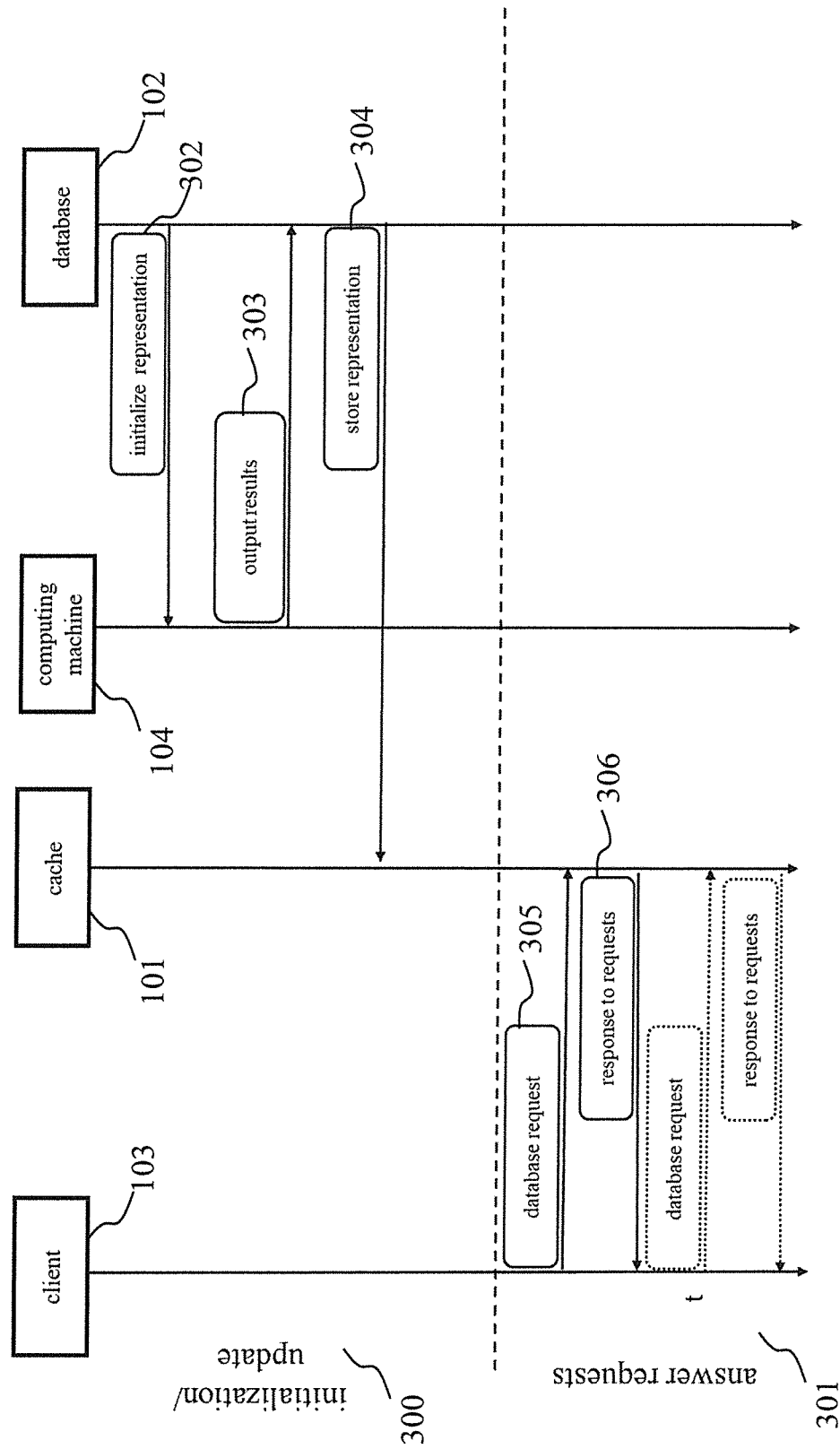
FIG. 3 shows a sequence chart illustrating the cache initialization/update and cache utilization.

In some embodiments, the following two mechanisms shown in FIG. 3 relate to initializing and/or updating the representation 105 in the cache 101 on the one hand and utilizing the cache 101 in order to answer database requests from the cache 101 on the other hand. To initialize or update 302 of the representation 105 of the cache 101, the first mechanism e.g., generates any defined database request on the database 102 of the database system 100 by a computing machine 104. One or more results outputted for any database request is stored in the representation 105 of the cache 101. Where no result is outputted on processing a database request, nothing is stored in the representation 105 of the cache 101 for this database request. The same process is repeated in order to re-initialize the cache 101 or to perform a complete update of the cache 101.

In other embodiments, initialization is done by a given transformation process mapping the data of the data space 106 to the data forming the representation 105 without directing a permutation of database requests to the database 102. For example, the cache 101 may store materialized views of the data stored in the database 102 and the data retrieval requests retrieve the views from the cache 101.

Separated from the initialization or update of results 300 on the computing machine 104, database requests are answered 301 from the cache 101. Database requests 305 of clients 103 are received at the cache 101. If one or more results for the database request are stored in the representation 105 of the cache 101, the cache 101 responds 306 to the database request by returning one or more of the results to the client 103. Otherwise, the cache responds 306 by returning an invalidity notification.

In some embodiments, the representation 105 of the cache 101 includes a number of data records. Each data record includes a key-value combination. The database request includes a key of one or more data records and the one or more results for the database request includes one or more values of the one or more data records.

In some embodiments, the key-value combination represents a connection path between an origin node and a destination node in a communication network. The key specifies the origin node and destination node in the communication network and the value is one or more paths from the origin node to the destination node. The origin node is connected directly or via one or more intermediate nodes to the destination node.

In example embodiments, an origin and/or destination node as well as intermediate nodes in the communication network 200 of FIG. 2 are servers 202 connected by local area network (LAN), wireless local area network (WLAN) and/or wide area network (WAN). However, the type of connection in the communication network 200 is not restricted to servers or special types of networks. The servers 202 constitute a communication network 200 in which the servers 202 work subsequently or in parallel on common tasks, exchange data or process operational database requests. In order to communicate with another server, a queries the database system 100 in order to determine whether there is any route to the other server and/or which route is available.

In the example embodiment of FIG. 2, the representation 105 of the cache 101 stores for each pair of servers in the communication network 200 one or more routes 201 by a key-value pair. The key-value pair includes as a key the pair of servers including a permutation of an origin server and a destination server of all servers 202 in the communication network 200, and as a value one or more routes 201 between the origin and destination server 202.

For example, for a pair of servers (2, 3), available routes 201 in the communication network interconnecting origin server 2 with destination server 3 are "b", "e-h-i-d-c", "f-g-h-i-d-c". As a result for the pair of servers (2, 3), a key-value pair <(2, 3), (b)> is for example stored in the representation 105 of the cache 101. In another example, the key-value pair <(2, 3), (b, e-h-i-d-c)> or <(2, 3), (b, f-g-h-i-d-c)> is stored, where the cache 101 is configured to store two routes 201, where available for each pair of servers. In yet another example where the cache 101 is configured to store all available routes 201 for any pair of servers, the key-value-pair <(2, 3), (b, e-h-i-d-c, f-g-h-i-d-c)> is stored in the representation 105. In an example where subroutes b and i are disrupted and there is no available route 201 between origin server 2 and destination server 3, the cache 101 does not store a key-value-pair for the pair of servers (2, 3).

In known mirroring systems such as US2016/0042278 A1 which store all portions of data included in the database and therewith mirror the content of the database, the cache consumes as much storage resources as the database itself. In addition, the processing time for outputting a result is not saved in those known systems, but only shifted from processing the database request at request time on the database to processing the database request on the cache. For the client this does not save any response times—neither for valid database requests outputting a result nor for invalid results not outputting a result at request time. The cache 101 storing preprocessed results for any valid database request as a key-value pair not only directly answers any database request instantaneously as previously explained, but stores these results in a more efficient manner in terms of memory and response time than the mirroring systems. Moreover, invalid requests are instantaneously answered by an invalidity notification. Therewith, any request is directly answered from the cache 101.

In some embodiments, the representation 105 stored in the cache 101 includes for one or more database requests fewer results than the data space 106 of the one or more databases 102 of the database system 100 is able to output. The fewer results form a result subspace. The result subspace is given based on a probability that the results in the representation 105 of the cache 101 remain valid over time. Insofar there are database request for which the data space 106 of the at least one database 102 is able to output more than one result, a subset of these multiple results, but not all results are stored in the cache 101. Where the data space 106 is only able to output one result, this result is stored in the representation 105 of the cache 101. Where no result is outputted, nothing is stored in the representation 105 of the cache 101 for the database request.

The selection criterion for choosing a subset of fewer results than the number of results which are outputted by the data space 106 is the probability that the results in the representation 105 of the cache 101 remain valid over time. The probability may be stored in form of an indicator associated with the data in the database 102 and/or the preprocessed results in the cache 101. This probability is for example obtained by evaluating a history of change frequencies of results in the representation 105 of the cache. One or more results are outputted on preprocessing any database requests on the database 102 of the database system 100 including the data space 106 in an initialization of the cache 101 or also when updating the cache 101. Updates of the cache 101 may be performed in intervals or on detecting changes by monitoring the data space 106. However, the update process is not restricted to those examples. Updates trigger a re-computation of results to store in the representation 105 of the cache 101. The results are obtained by processing single database requests on the database 102 again or as a complete re-computation of any database requests. On the basis of an update history, probabilities that the results in the representation 105 of the cache 101 remain valid over time are obtained.

Figure 4:
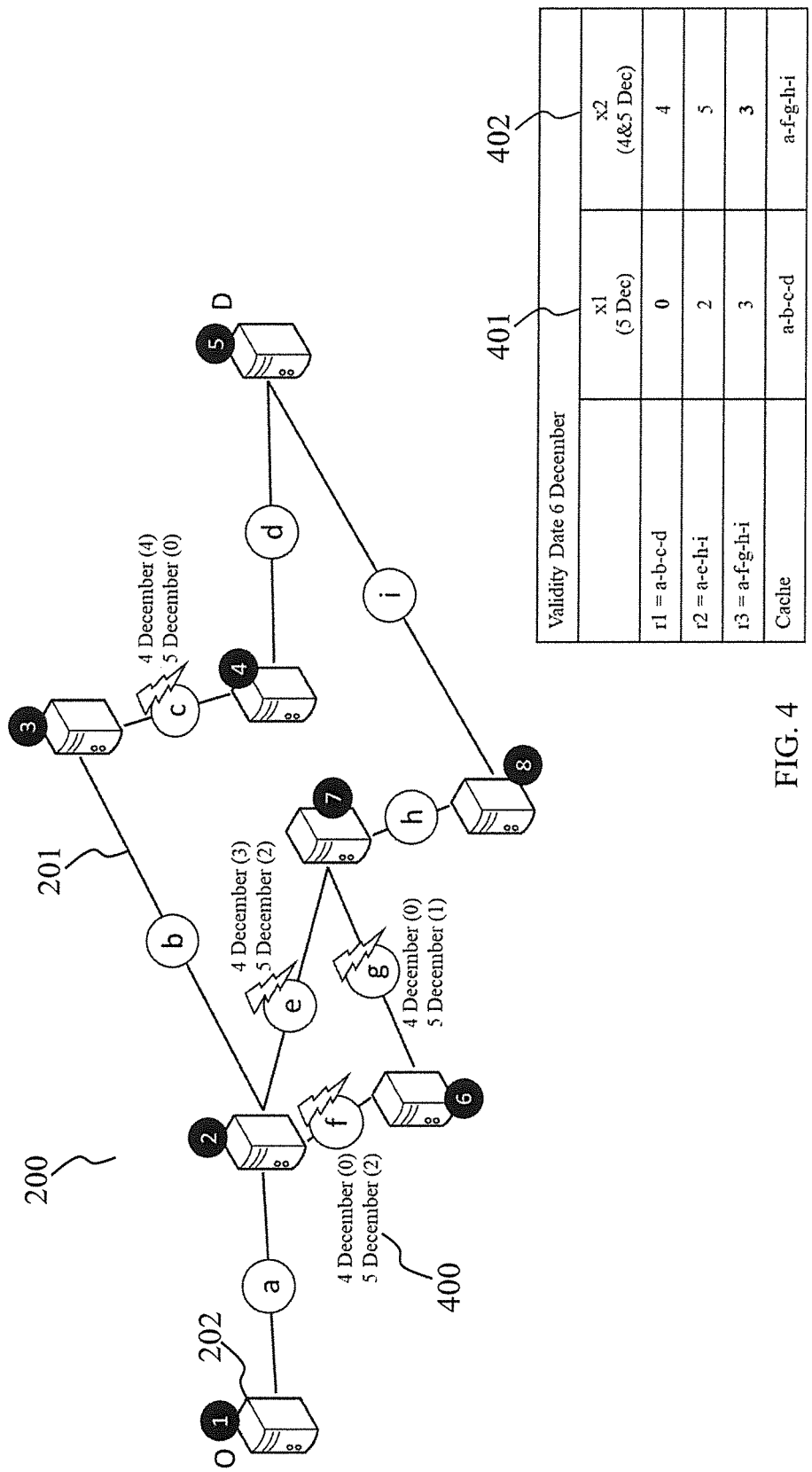
FIG. 4 supplements the communication network of FIG. 2 with a history of changes.

In FIG. 4, the communication network 200 of FIG. 2 is supplemented with a history 400 of changes due to disruptions in subroutes of the communication network 200 within two days. The history of changes may be stored in the database 102 of the database system 100, may be aggregated by an internal or external monitoring, or be implemented in any other suitable way. From the history 400 of disruptions a probability that a route between an origin server O and a destination server D remains unchanged is determined by assuming that a route 201 which was not disrupted in the past has a higher probability to remain unchanged and is also not disrupted in the future. Processing an update at the 6$^{th}$ December for routes between origin server O and destination server D without taking into consideration a history 400 outputs three routes r1: a-b-c-d, r2: a-e-h-i and r3: a-f-g-h-i.

Taking into account a history 401 of one day in the past x1, the history reveals that on the 5$^{th}$ December route r1 had no disruptions, route r2 had 2 disruptions, namely in subroute e, exhibiting 2 disruptions on the 5th December and route r3 had 3 disruptions, namely in subroute f, exhibiting 2 disruptions and in subroute g, exhibiting 1 disruption on the 5$^{th}$ December. Therefore, taking into account a history of one day 401 in the past, the route which has the highest probability to remain unchanged in the future, is r1. Hence, route r1: a-b-c-d is chosen and stored in the representation 105 of the cache 101.

In another example, a history of two days 402 in the past x2, namely the 4$^{th}$ and the 5$^{th}$ December is taken into account. In this example it turns out, that route r3 has the highest probability to remain unchanged in the future. Hence, route r3 will be chosen and stored in the representation 105 of the cache 101.

However, determining the probability that the results in the representation 105 of the cache 101 remain valid over time is not restricted to the method in this example.

In contrast to US2010/0036805A1 where data stored in the cache is updated each time when the corresponding data in the database changes, the advantage of choosing results to store in the cache 101 by the validity of the results stored in the representation 105 is that the cache 101 optimally preserves consistency of the stored result with results outputted by the data space 106 of the database 102 in the database system 100. The number of updates decreases in relation to the time over which a result stored in the cache remain valid. Therewith, the number of updates of the cache 101 is minimized saving system resources for such updates.

In some embodiments, the representation 105 stored in the cache 101 includes two or more results for database requests which are outputted on preprocessing the database request on the data space 106 of the one or more databases 102 of the database system 100. Returning the one or more results for the database request from the cache 101 includes returning one or more of the two or more results having the indicator indicating the highest probability to remain valid over time.

In an example embodiment, all of the two or more results stored in the cache 101 are returned in response to receiving a database request for such a database request. In another example embodiment, first only the result with highest validity is returned by the cache 101. An additional result is returned, if available, where an additional database request is received from the client 103, requesting one or more alternatives to the first result returned. In example embodiments, the cache 101 stores the probability that the results in the representation 105 of the cache 101 remain valid over time along with the respective result. In response to receiving a database request by a client 103, the cache 101 returns the result with the highest probability.

In other example embodiments, the cache stores the two or more results in a sorted list, such that the position of a result in the list indicates the relation of the probability in the order of the highest probability first. Therewith, no additional memory is utilized for storing the probability itself. In response to receiving a database request by a client 103, the cache 101 returns one or more of the first elements of the sorted list. Therewith, the results with the highest validity are returned.

Figure 5:
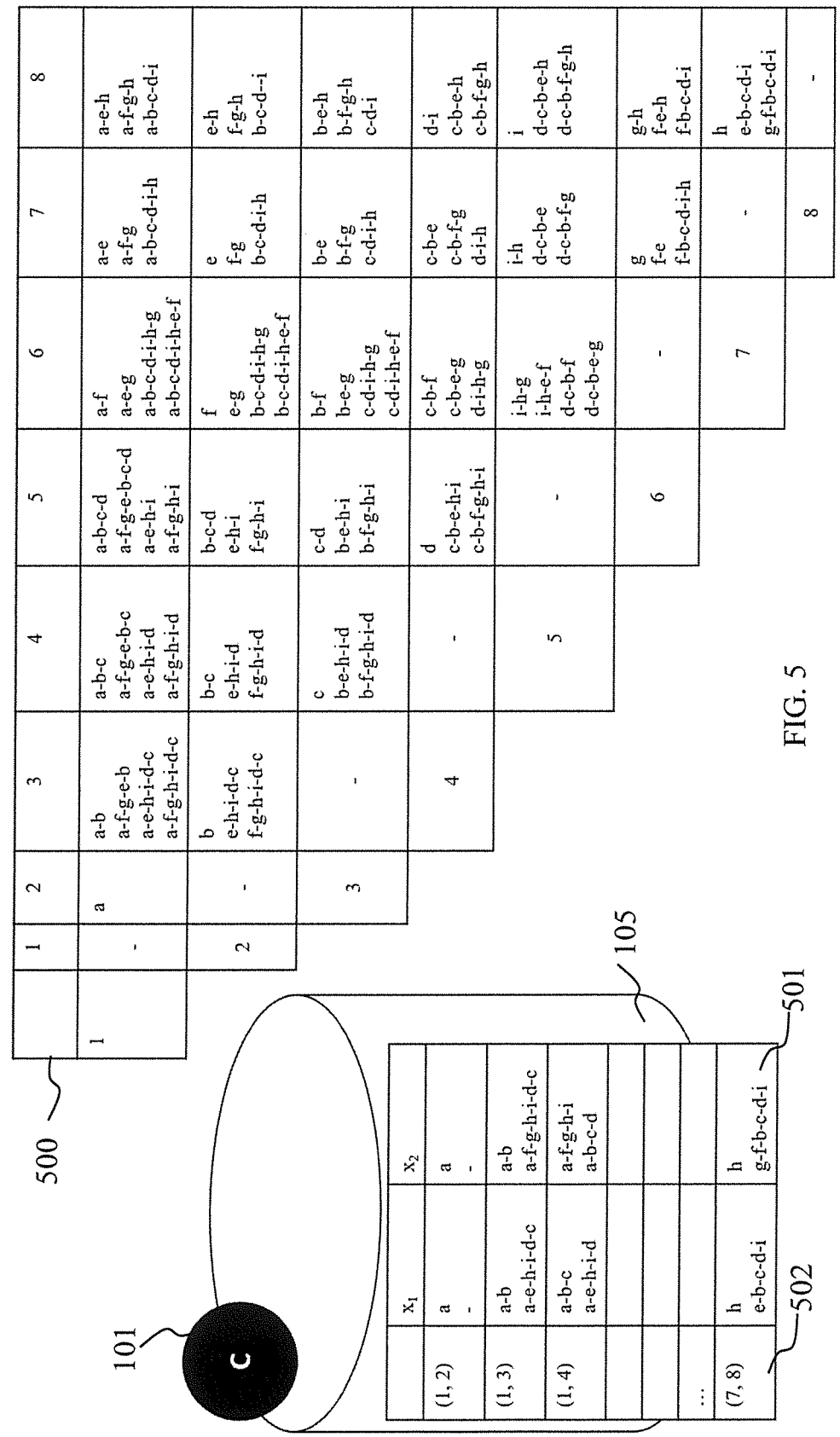
FIG. 5 visualizes a cache storing two or more results.

In FIG. 5, all results outputted on processing any database request on connections between servers 202 for all pairs of servers in the communication network 200 in FIG. 4 are shown in a table 500. In this example embodiment, the cache 101 stores in the representation 105 two of the outputted results, if available. The results, stored in the cache 101 are chosen by the highest probability that the results in the representation 105 of the cache 101 remain valid over time viz. having the highest validity of all outputted results for each of the pairs of servers. The cache 101 stores the outputted and chosen routes 501 for any pair of servers 502 in a sorted list 501 in the representation 105.

In the example embodiment of FIG. 5, the representation 105 of the cache 101 stores for the pair of servers (1, 2) the only result outputted on processing the database request for a connection between server 1 and server 2 on the data space 106, which is route "a". For the pair of servers (1, 3) the data space 106 outputs on processing four possible routes s1 to s4 shown in line two, column four of table 500. The number of disruptions 400 is shown in the communication network 200 in FIG. 4. For the pair of servers (1, 3) for example, the number of disruptions is shown determined by a history of one day x1 and a history of two days x2 in TAB. 1.

TABLE 1

| route | number of disruptions by x1 | number of disruptions by x2 |
|---|---|---|
| s1 = a – b | 0 | 0 |
| s2 = a – f – g – e –b | 2 (f) + 1 (g) + 2 (e) = 5 | 2 + 0 (f) + 1 + 0 (g) + 3 + 2 (e) = 8 |
| s3 = a – e – h – i – d – c | 2 (e) + 0 (c) = 2 | 2 + 3 (e) + 0 + 4 (c) = 9 |
| s4 = a – f – g – h – i – d – c | 2 (f) + 1 (g) + 0 (c) = 3 | 2 + 0 (f) + 1 + 0 (g) + 0 + 4 (c) = 7 |

In this example, the representation 105 stores the two results having the highest validity for each of the pairs of servers. Therewith, for the pair of servers (1, 3) with a history of one day x1, the cache 101 stores s1 as a first result, indicating that the pair of servers (1, 3) has the highest probability, and s3 as a second result, indicating that the pair of servers (1, 3) has a lower probability than s1 but a higher probability than any other result for the pair of servers (1, 3) outputted from the data space 106. With a history of two days x2, the cache 101 stores for the same reasons s1 as a first result, and s4 as a second result.

However, in the same way also more than two routes outputted from the data space 106 are stored in the representation 105 of the cache 101, if available. For the pair of servers (1, 2) the representation 105 of the cache 101 only stores route "a" as a first result and no second result. If no result is outputted on processing nothing is stored for the pair of servers in the cache 101. Hence, the cache 101 is able to answer any database request on the availability of routes 201 between two respective servers 202. Additionally, the cache 101 of the example embodiment is configured to return an alternative result, if available, in the order of highest validity.

In some embodiments, in response to returning an invalidity notification to a received database request, the number of occurrences of the received database request for which an invalidity notification is returned is accumulated. The system managed by the database system 100 is then optimized by either trouble shooting identified problems or restructuring. Hence, for the communication network of FIG. 2, the communication network is optimized by including a new route in response to determining that the number of occurrences of invalidity notifications exceeds a predefined threshold, where the invalidity notifications indicate a missing route for which database requests are received from several clients 103.

Figure 6:
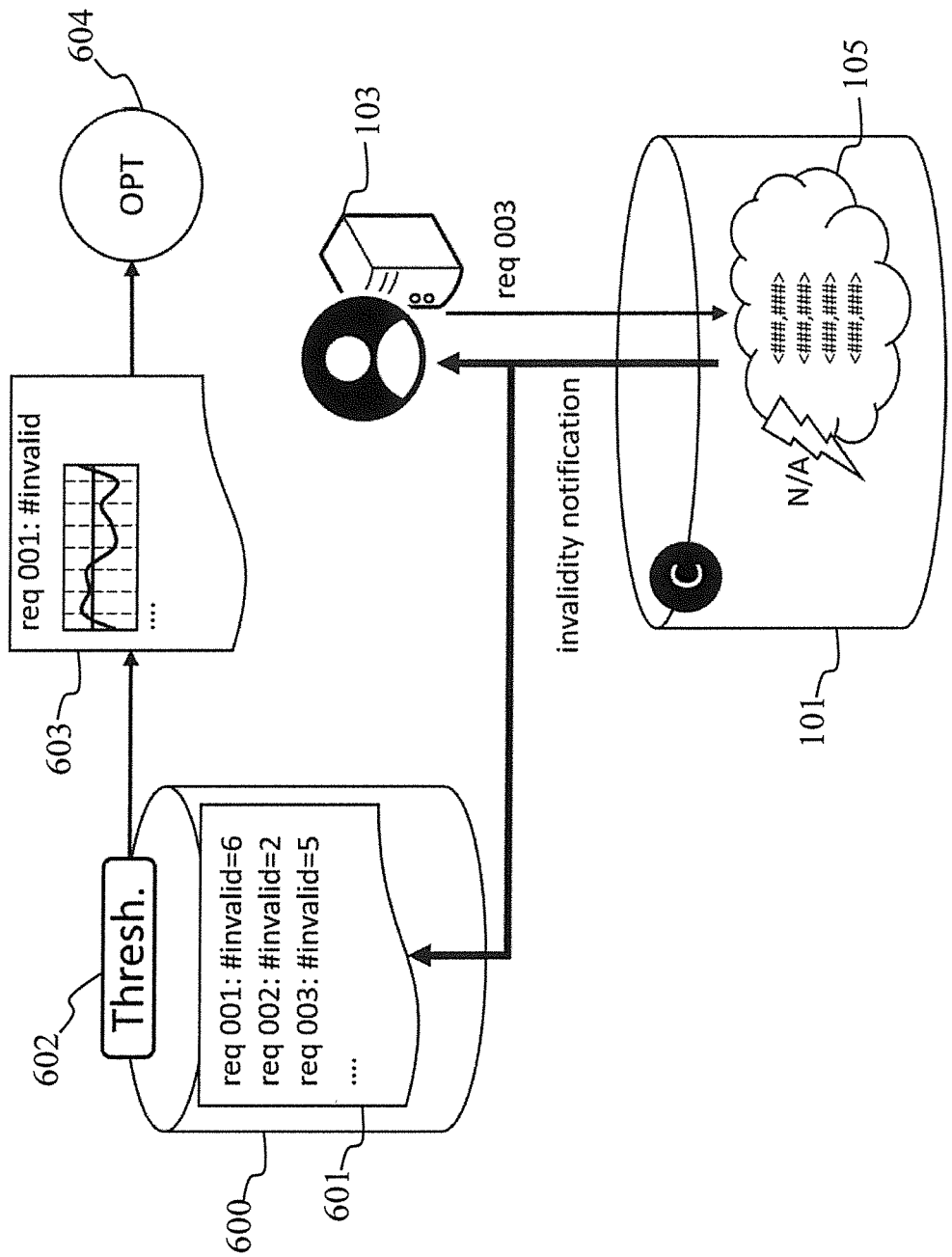
FIG. 6 illustrates an extension of the system in FIG. 1 for exploiting invalidity notifications.

In an example embodiment, a database request is received at the cache from a client 103 to the cache 101. The representation of the cache 105 has no result for the database request available. In order to exploit invalidity notifications returned in response to the received database request, the database system 100 of FIG. 1 is extended by an additional analysis of such database requests as shown in FIG. 6. In response to returning an invalidity notification to the client, the received database request for which no result is available in the representation 105 of the cache 101 is stored 601. Where the same database request is repeatedly received from a client 103, and again an invalidity notification is returned for this database request, the number of occurrences of this request is accumulated. The database request as well as the corresponding accumulation is for example stored in another cache 600. In other example embodiments, the database request with the corresponding accumulation is stored in the same cache 101 as the representation 105. In some example embodiments the accumulation of occurrences of the database request for which an invalidity notification is returned is stored for all clients 103 in common. In other example embodiments, the accumulation of invalidity notifications returned to the database request is stored for each client 103 separately. The embodiments are however not restricted to store database requests and their corresponding accumulation of invalidity notifications in this way.

For example, database request req 003 in FIG. 6 was already received at the cache 101 and an invalidity notification was returned before for #invalid=5 times 601. Now, req 003 is received again. The representation 105 of the cache 101 still has no result available (N/A). An invalidity notification is returned to the client 103 and the stored accumulation 601 of invalidity notifications for req 003 is increased by one, yielding req 003: #invalid=6.

A threshold 602 for #invalid is predetermined by an administrator or automatically by a threshold function. Further the threshold 602 is set, in some example embodiments, for all stored database requests with their corresponding accumulation in common. In other example embodiments, the threshold 602 is set for each of the database requests separately. In other example embodiments, the threshold 602 is set for groups of database requests. Setting the threshold is however not limited to these methods.

Where the number of occurrences #invalid for one or more stored database requests 601 for which invalidity notifications have been returned exceeds the predetermined threshold 602, a report and/or an alert is generated for those requests and pushed to an optimizer 604. The optimizer 604 for example is an administrator evaluating frequently received requests for which an invalidity notification was returned. On the basis of the evaluation, an optimization for the database system 100 is performed. In another example, the administrator evaluates the report with regard to troubleshoot problems of the data space. In another example, the optimizer 604 is a software agent evaluating the report and/or and automatically performing optimizing adjustments on the database system 100. The functionality and type of optimizer 604 is not restricted to these examples.

For example, regarding the communication network of FIG. 4, the cache 101 repeatedly receives a database request from a client 103 for a communication route from server 2 to server 6 on $5^{th}$ December. The database request is repeatedly received during the time where subroutes e, f and g are disrupted so as server 6 is not available from server 2 at the time of repeatedly receiving the database request. For each time the database request is received, an invalidity notification is returned to the client 103 and the number of occurrences of returning an invalidity notification for this database request is accumulated in a separate cache 600. When receiving the database request for the fourth time and an invalidity notification is returned to the client 103, the number of occurrences exceeds a predetermined threshold, which was, for example, set to three. A report, including at least the database request and the number of occurrences, is sent as an alert to a software agent monitoring the communication network. In response to this alert, the software agent notices the problem of non-availability of server 6 in the network and provides troubleshooting actions.

In another example, the cache frequently receives database requests on routes including a server 9 as destination server, which is currently not available in the communication network 200 in FIG. 2 up to now. Server 9 is a popular destination for many clients 103. Since server 9 is not connected to the communication network 200, the cache 101 returns invalidity notifications for all database requests including server 9 as a destination. When the number of occurrences of invalidity notifications for those database requests (which are potentially different, but all include server 9 as destination) one or more alerts and/or reports are outputted and sent to e.g., an analysis tool. The analysis tool on evaluating the one or more reports summarizes that there is a requirement of many clients 103 to connect to server 9 to be available in the communication network. The communication network then can be optimized with regard to the requirements of the clients 103.

Hence, accumulating occurrences of invalidity notifications for database requests and reporting and/or alerting when the number of occurrences exceeds a predetermined threshold allows for an optimization and/or trouble shooting of the database system 100 or the underlying system configuration for which the results are stored in the cache 101. It also allows for adapting the database system 100 in regard to (potentially changing) requirements of clients 103 from which the database requests are received.

In some embodiments, the cache 101 is arranged to retrieve one or more additional results outputted from the data space 106 of the database 102 of the database system 100, wherein the one or more additional result is returned in addition to the result returned from the representation 105 of the cache 101.

In an example embodiment, the cache 101 in response to receiving a database request from a client 103 additionally retrieves a result outputted from the data space 106 of the database 102 of the database system 100 for the received database request. In the example embodiment of utilizing the cache 101 in an application for a communication network 200 of FIG. 2, a database request from a client 103 is received at the cache 101, requesting an available route for the pair of servers (1, 4). The cache 101 in this example embodiment stores one result for any pair of servers if available. For the pair of servers (1, 4) it stores the key-value pair <(1, 4), a-b-c>. In response to receiving the database request from the client 103, the cache 101 retrieves an additional result "a-e-h-i-d" outputted from the data space 106 and returns both key-value pairs <(1, 4), a-b-c> and <(1, 4), a-e-h-i-d>.

The advantage of this embodiment of the cache 101, additionally to avoiding load for invalid database requests, is on the one hand to answer any valid database request from the representation 105 of the cache 101 in a storage efficient way, and on the other hand to provide alternative results for a database request where desired, therewith only consuming processing time where alternative results are requested.

In some embodiments, the representation 105 of the cache 101 is updated with an at least one additionally retrieved result.

Figure 7:
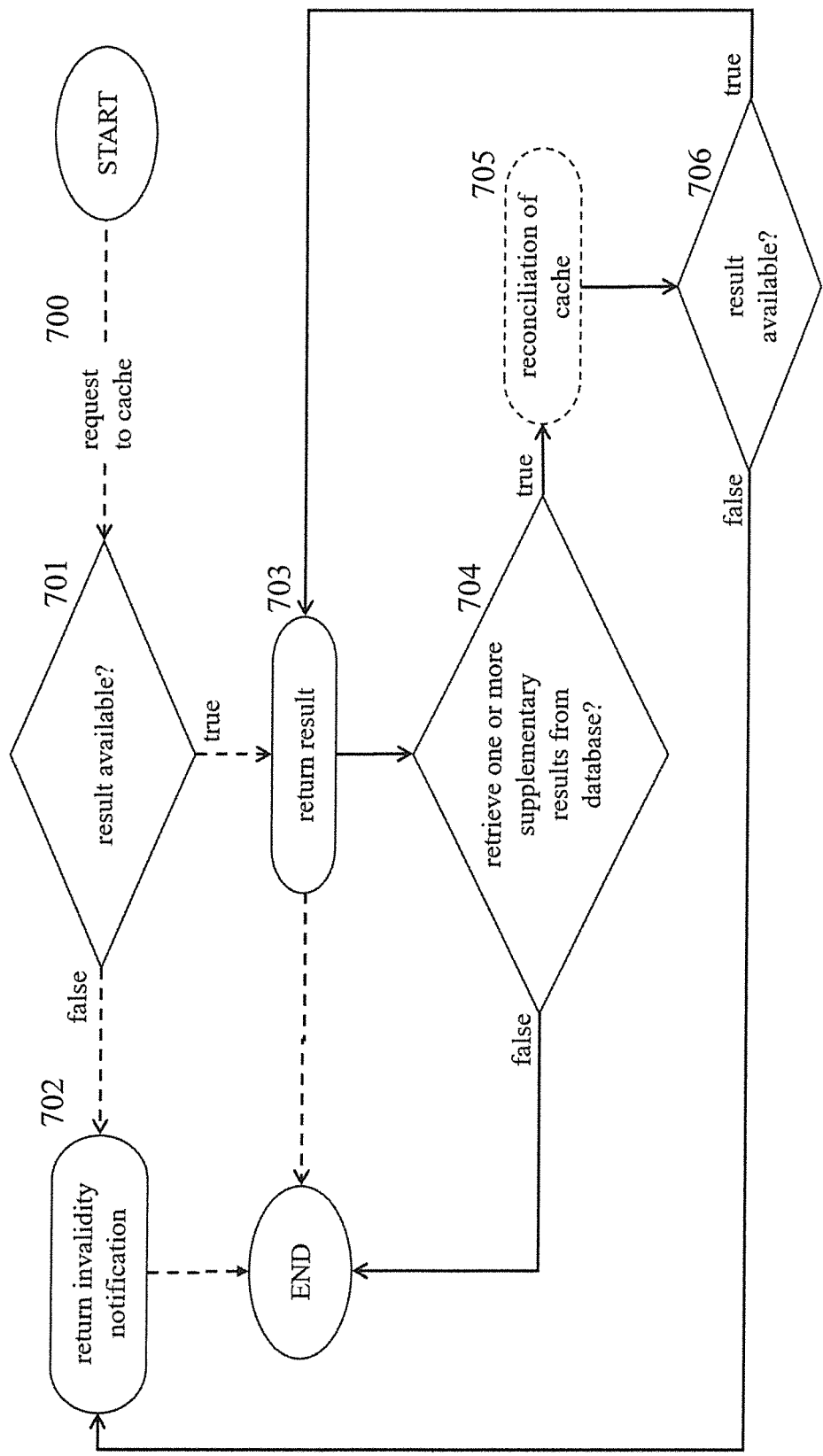
FIG. 7 shows a flow chart illustrating to retrieve an additional result from the data space.

In an example embodiment, the cache 101 retrieves one or more additional results from the data space 106 of the database 102 according to the flowchart shown in FIG. 7. This occurs for example in a situation where a request demands more results than stored in the cache 101 or a follow-up request demands further results in addition to the at least one result from the cache 101 in response to a first request. In response to receiving a database request 700, the cache 101 looks up 701 if a result for the database request is available in the representation 105 of the cache 101. If this is false, because no result is stored or there is a parameter indicating that the result is not available for the current request as e.g., explained for the network example of FIG. 2, the cache 101 returns an invalidity notification 702. This general path, as explained above, is indicated by dashed arrows in FIG. 7 from 701 to 702 to END and from 703 to END. If a result is available in the representation 105 the result is returned 703, as in the general example. In this example embodiment the cache 101 evaluates if a supplementary result 704 from the database 102 for the result already returned is demanded by the current or a follow-up request, in response to a first request. If one or more supplementary results are demanded, the cache 101 tries to retrieve the one or more supplementary result 704 from the data space 106 of the database 102. The option to retrieve a supplementary result 704 from the database 102 is indicated by continuous lines in FIG. 7.

There are different possibilities to retrieve one or more supplementary results 704 from the database 102. For example, in addition to the returned result 703 from the cache 101, the current request or follow-up request demands all available results from the database 102, e.g., the cache 101 returns the result with the highest probability to remain unchanged over time, but the source of the request decides on own, divergent criteria, which one is the best for its purpose, and the already returned result did not fit well to those individual criteria, the selection of a best result is decided on the own criteria and therewith needs all results. In another example, one or more supplementary results beyond the result already returned 703 from the cache are demanded. In a third example, one or more supplementary results are retrieved 704 from the database 102 to verify validity of the cached results. Retrieving a supplementary result is not restricted to these examples. However, retrieving a supplementary result from the database 102 demanded by the current or a follow-up request includes the option for a reconciliation 705 of the cache 101, which maintains, updates or removes the current results of the cache 101 and/or its parameters e.g., indicating availability. Details on this reconciliation 705 of the cache 101 is explained in the further course of the description when dealing with updates of the cache.

In the example embodiment of implementing the cache 101 for the communication network 200 of FIG. 4, a database request from a client 103 is received at the cache 101 at the 5$^{th}$ December, requesting an available route for the pair of servers (1, 5). The cache 101 stores the most valid route outputted since the last update of the cache 101 as a key-value pair <(1, 5), a-e-h-i>. Having stored this result 701, the cache 101 tries to retrieve an additional result 703 outputted from the data space 106. An additional result is outputted from the data space 106. On processing the database request on the database 102, a new route "a-b-c-d" is outputted, since the data space 106 has changed since the last update, and the route with the highest probability that the results in the representation 105 of the cache 101 remain valid over time is now associated with the new route 201, additionally outputted from the data space 106. The probabilities of routes "a-e-h-i" and "a-b-c-d" are compared 706, and since the new route "a-b-c-d" has the higher probability that the results in the representation 105 of the cache 101 remain valid over time, the key-value-pair <(1, 5), a-e-h-i> formerly stored in the cache 101 is replaced 608 by the key-value-pair <(1, 5), a-b-c-d> including the new route as a value. The replaced key-value-pair is then returned 607 to the client 103.

The technical effect of this embodiment in contrast to the system and methods of US 2010/0036805 and US2016/0042278A1 is that still any load on the database system during request time is avoided for invalid database requests, since invalid database requests still are answered directly from the cache 101 by an invalidity notification 702. And on the other hand, for every valid database request the cache is able to return one or more results. Where the results stored in the cache 101 are outputted by a transformation of data of the data space 106, a search of data on the data space 106, or a selection of transformed and/or searched results from the data space 106. However, valid database requests are proven and partially updated in response to receive a database request at the cache 101. As a consequence, it is ensured that the returned result is the most valid result at request time amongst all results outputted on processing the database request.

Figure 8:
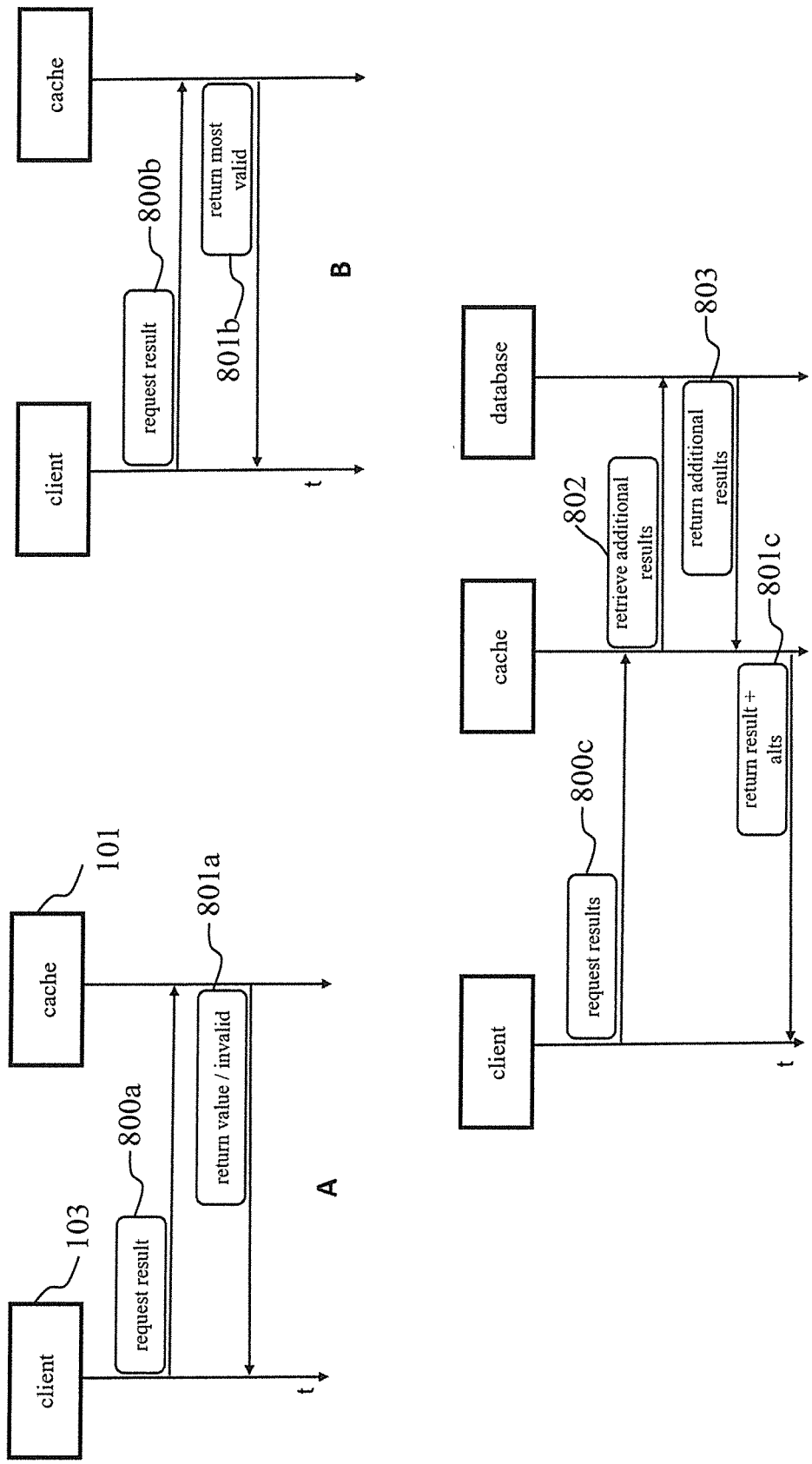
FIG. 8 shows three sequence charts illustrating responses of the cache.

Summarizing the above-mentioned example embodiments, the cache 101 returns results from the representation 105 according to the configuration of the cache 101. However, the configuration of the cache 101 with respect to returning results is not restricted to those examples. According to an example A in FIG. 8, in response to receiving a database request 800a from a client 103, the cache 101 returns a result 801a if stored in the representation 105. Otherwise the cache 101 returns an invalidity notification.

According to an example B in FIG. 8a, the representation 105 of the cache 101 stores more than one outputted result, and an indication for a probability of the results in the representation 105 of the cache 101 remain valid over time. In response to receiving a database request 800b from a client 103, the cache 101 returns the most valid result 801b.

According to an example C, the representation 105 of the cache 101 stores one or more results for any database request outputted on processing. In response to receiving a database request 800c, the cache 101 storing a result for this database request in the representation 105 retrieves an additional result 802 outputted from the data space 106. The additionally retrieved results 803 outputted from the data space 106 are optionally utilized to reconciliate the stored result in the representation 105 of the cache 101 and/or to return 801c alternatives in addition to the stored result in the representation 105 to the client 103. In any of these examples, the cache 101 directly returns an invalidity notification in response to receiving a database request if no result is stored in the cache 101 for the database request. Therewith, any processing load utilized by invalid database requests on the database system 100 is avoided at time of database request independent of the way valid database requests are answered by the cache 101.

In some embodiments, the cache 101 stores two or more representations, wherein each representation 105 includes one or more results for any database request for which the data space 106 of databases 102, different to the data space 106 of the databases 102 of other representations, is able to output a result.

In an example embodiment, the database system 100 includes a plurality of databases 102 from different tenants. The tenants are utilizing the database system 100 by database requests from their respective clients 103. In some example embodiments, the database requests of the clients 103, requesting results processed on the data spaces 102 of their respective tenant. In other example embodiments, the database requests of the clients 103 requesting results as a combination of processing results on data space 106 from different tenants. For example, in a cloud environment, including a plurality of servers from different providers (tenants) clients 103 want to utilize resources from servers from different providers.

In some embodiments, the representation 105 of the cache 101 includes one or more predicted results for any database request, predicting results outputted on processing any database request by evaluating a history of results.

In an example embodiment, from the history of disturbances 400 in communication network 200, a prognosis for each day of the next month are precomputed. The representation 105 of the cache 101 then has a time granularity exhibiting for each day of the next month the predicted results and a predicted probability that the results in the representation 105 of the cache 101 remain valid over time. From the predicted number of disturbances, a probability that the results in the representation 105 of the cache 101 remain valid over time for each of the stored results for each day is computed. A database request received at the cache 101 then includes a date for which the requested result is returned from the representation 105 of the cache 101.

In some embodiments, the cache 101 is updated based on probabilities that the results in the representation 105 of the cache 101 remain valid over time.

Figure 9:
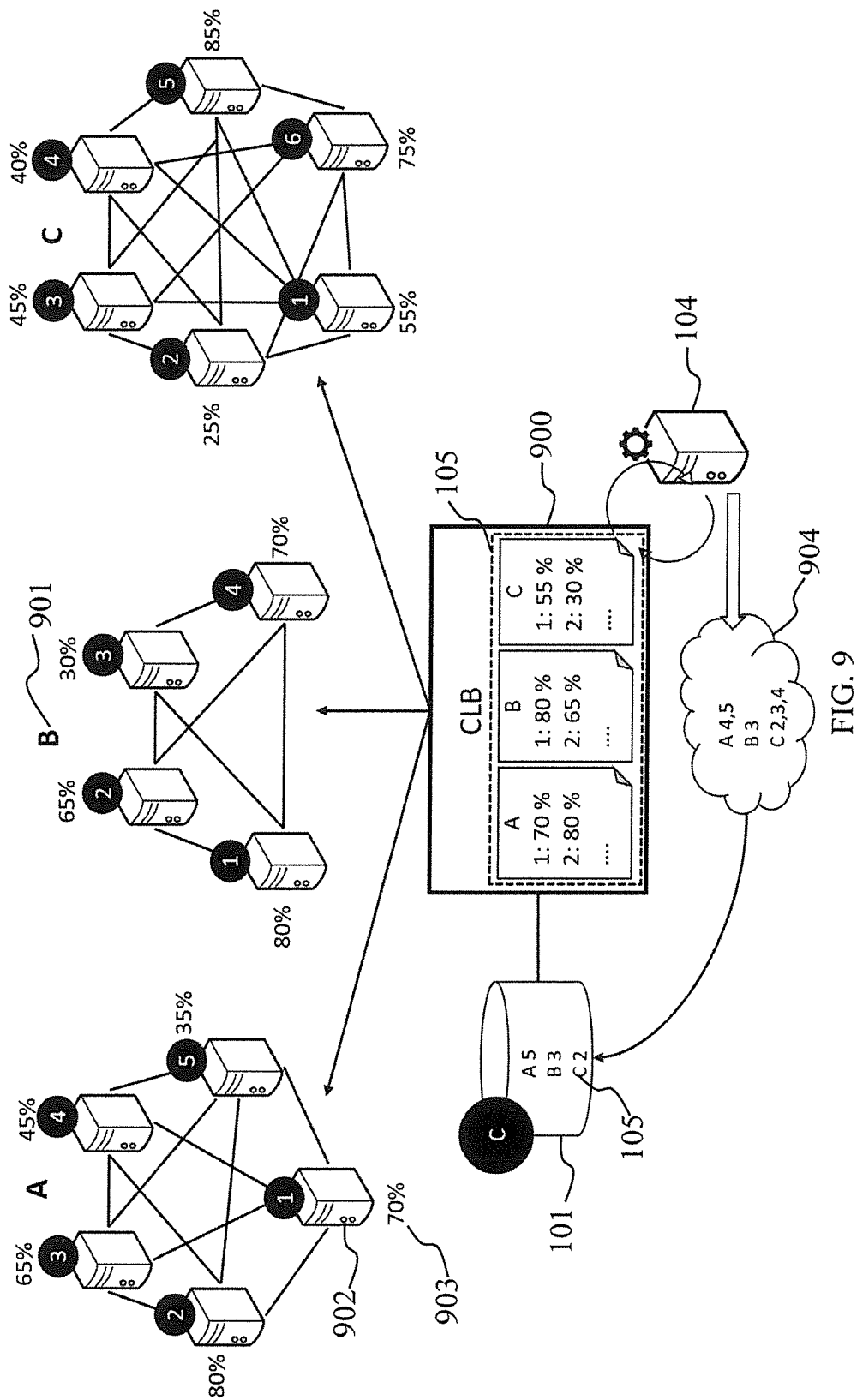
FIG. 9 illustrates the application of the data base system implementing a cluster load balancer.

In an example embodiment, the database system 100 is implemented by a cluster load balancer 900 shown in FIG. 9, including a cache 101 storing in the representation 105 for any server cluster 901 one or more servers 902 available for receiving tasks. For distributing tasks, the cache 101 receives a database request from the load balancer 900 requesting a server cluster 901 including a server 902 to which a task is then distributed.

The cluster load balancer 900 stores for each server cluster 901 the utilization 903 of the respective servers 902 included in the respective server clusters 901. The cluster load balancer 900 distributes a task to a server cluster 901 and/or to a respective server 902 therein, if the server cluster 901 includes a server 902 exhibiting a utilization 903 of 50% or less.

The cache 101 is initialized by determining by a processing machine 104 on the data space 106 all servers 902 in the respective server clusters 901 that exhibit a utilization 903 of 50% or less. The processing outputs 904 for server cluster A the results 4 and 5, for server cluster B the only result 3, and for server cluster C the results 2, 3 and 4. The cache 101 stores only one server for any server cluster 901 outputted on processing.

A probability that a server 902 in the respective server cluster 901 is available to receive distributed tasks from the cluster load balancer 900 over time is higher than the probability for another server where the utilization of the server is smaller than the utilization of the other server. For example, server 5 of server cluster A with a utilization of 35% has a higher probability to be available for receiving a task, since the work load of server 5 is lower than server 4 of cluster A with a utilization of 45%. Server 4 of server cluster A is near to pass a utilization of 50% and therewith not being available for receiving tasks anymore in this example.

The utilization of server 5 may change from 35% to 40% or more. As long as it does not exceed the utilization of server 4, the probability to be available for receiving a task is still higher as the probability to be available for receiving a task as for server 4. Therewith, the data stored in the data space 106 of the cluster load balancer 900 may change but the outputted results for server cluster A which are servers 4 and 5 remain. On the other hand, the utilizations may also decrease without changing the outputted results and therewith not influencing the decision on distributing a task to a respective server 902 in server cluster A. The decision on distributing is taken on the processed results, e.g., where server 4 increases utilization exceeding 50% not outputting a result, or where server 4 decreases utilization under 35% and therewith is given preference above server 5, when one result is chosen to store in the cache 101. Hence, on processing the results on the computing machine 104 the cache 101 stores the result with the highest probability that the result outputted on processing remains unchanged rather than storing the result with the highest probability that the data of the data space 106 the result is related to changes.

Thus, in the example of FIG. 9 described above, the cache 101 stores for server cluster A server 4 with a utilization of 35%, for server cluster B server 3 with a utilization of 30%, and for server cluster C server 2 with a utilization of 25%.

The cache 101 receives a database request from the cluster load balancer 900 to provide a server 902 from server cluster B which is available for receiving a task. The cache 101 returns server 3, since this is the server with the highest probability to remain available over time, having the lowest utilization 903. Then, the cluster load balancer 900 distributes the task to server 3 in server cluster B.

In another example, each server cluster 901 includes an additional own load balancer controlling the distribution of tasks within the respective server cluster 901. The cluster load balancer 900 stores in the data space 106 the utilization 903 of all servers 902 in the respective server clusters 901. On initializing the cache 101, the cache 101 stores for each server cluster 901 the utilization 903 of one server 902 having the lowest utilization 903 amongst all servers 902 of the respective server cluster 903. In another example, the mean of all utilizations 903 of the servers 902 in each of the server clusters 901 is stored. Therewith the cache 101 stores for server cluster A a mean utilization of 59%, for server cluster B a mean utilization of 61%, and for server cluster C a mean utilization of 54%.

The cache 101 receives a database request from the cluster load balancer 900 to provide a server cluster 901 having stored the lowest utilization 903 amongst all stored utilizations for the server clusters 901. The cache 101 returns server cluster C with a stored utilization of 25% or server cluster C with a stored mean utilization of 54%. The cluster load balancer 900 then distributes the task to server cluster C, where the load balancer additionally included in server cluster C further distributes the task to one or more of the servers 902 of server cluster C.

In another example, server cluster C is affected by a breakdown or no longer connected to the cluster load balancer 900. In response to a breakdown or a loss of connection the cache 101 performs an update. Hence, due to this update of the cache 101, no result is stored in the cache 101 for server cluster C. Alternatively, the result already stored in the representation 105 of the cache 101 for server cluster C is updated with a parameter defining a connection to server cluster C to be not available until further notice or a respective period of time. The cache 101 receives a database request from the cluster load balancer 900 to provide a server 902 of server cluster C which is available for receiving a task. Then the cache 101 returns an invalidity notification since no task can be distributed by the cluster load balancer 900 to server cluster C. In an example, where the cache receives a database request from the cluster load balancer 900 to provide a server cluster 901 having stored the lowest utilization 903 amongst all stored utilization for the server clusters 901. The cache 101 returns server cluster A where a mean utilization of 59% is stored in the cache 101 for server cluster A, or the cache 101 returns server cluster B where a utilization of 30% of the server 902 having the lowest utilization in the server cluster 901 was stored in the cache 101.

In this embodiment, the update of the cache 101 takes account for outputted results not relating directly to the data of the data space 106 of the database 102 but relating to an aggregation of data in the data space 106.

As already mentioned, an initialization and/or update of the cache 300 as shown in FIG. 3 is a mechanism, which is in general separated from the mechanism to answer requests 301. The update of the cache however, may be performed in any suitable way. Hence, the update mechanism is not restricted to the embodiments described herein.

In some embodiments, updating the cache 101 includes replacing a first result of the representation 105 by a second result for the same database request in response to determining that the second result has higher probability to remain valid over time than the first result.

In some embodiments, updating the cache 101 includes a replacement of a value of the result. In some embodiments, updating the cache 101 includes removing a stored result from the representation 105 of the cache 101, where updating the cache 101 yields that a result stored by the representation of the cache does no longer exist in the data space 106 of the databases 106. In some embodiments, updating the cache 101 includes updating one or parameters of the result e.g., defining under which conditions the result is available.

In some example embodiments, the representation 105 of the cache 101 is updated on recognizing that the data space 106 of the database 102 in the database system 100 has changed. Then, results and/or their parameters in the representation 105 of the cache 101 which are affected by the change are re-computed by the computing machine 104 at time of recognizing the change. On outputting more than one result for a re-computed database request, the one with the highest probability that the results in the representation 105 of the cache 101 remain valid over time is chosen to be stored in the representation 105 of the cache 101 at an update. Where the cache 101 stores more than one result in the representation 105, again, the results with the highest probability are chosen.

In some example embodiments, the cache 101 is updated on a recurring scheduled basis. Therewith, any database request for which data in the data space 106 related to results for the database requests has changed since the last scheduled update are re-computed, in order to determine whether the outputted results or their parameters also have changed. In some other example embodiments, the total of any database request is re-computed to update the entire representation 105 of the cache 101. For example, a new server 9 is introduced in the communication network 200 of FIG. 2. The representation 105 of the cache 101 stores for any permutation of servers 202, viz. any pair of servers one or more outputted results. As a consequence, an update triggered by adding a new server causes a complete re-computation of the representation 105 of the cache 101 taking into consideration also all new pairs of servers including the newly introduced server 9. Where more than one result are outputted on the re-computation of results for any database request, one or more results are chosen to be stored in the cache 101 in the order of the highest probability that the results in the representation 105 of the cache 101 remain valid over time.

In other example embodiments, the representation 105 of the cache 101 is updated when one or more supplementary results are demanded to be retrieved 704 from the database 102 as shown in FIG. 7. In general, the cache 101 is updated in a mechanism 300 separated from a mechanism 301 answering requests. As already mentioned, a request then is directly and adequately answered from the cache 101 by the stored result 703 or an invalidity notification 702 (equivalent to FIG. 3, 306). Where a request or a follow-up request demands one or more supplementary results to the result returned from the cache 101, there is an additional option for a reconciliation 705 of the cache 101 combining the two, in general separated, mechanisms 300, 301.

As already mentioned, there are different possibilities to retrieve one or more supplementary results from the database 102 and therewith, there are different possibilities for a reconciliation 705 of the cache, depending on the supplementary results retrieved from the database 102. If the current request or a follow-up request demands in addition to the already returned result from the cache 101 all results that are currently available on the database 102, a reconciliation of the cache 101 includes adding at least one retrieved supplementary result for the request in the cache 101 and therewith either enlarging the results for the request stored in the representation 105 and/or replacing the results for the request stored in the representation 105.

To select which results from all supplementary results are stored for an update of the cache 101, the probability to remain unchanged over time is compared to the results already stored in the cache 101. Where the probability of the supplementary results is the same or is lower than the probability of the results already stored in the cache 101, no update is performed. Where the probability of the supplementary results is higher than the results already stored in the cache 101, the stored results are replaced by the supplementary results with this higher probability to remain unchanged over time. If retrieval from the database 102 indicates that there is currently no result available at all for the request, e.g., in FIG. 2 a server has been removed completely from the network and no route to this server is available at all anymore, the cache 101 is updated by removing all results for the request from the cache 101. In some other examples, the results and their probability to remain unchanged over time are equal to the supplementary results retrieved from the database 102, but the parameters have changed. Then, the parameters of the results are updated. The retrieved supplementary results, whether or not they are added to the cache in 705, are returned 703. As already explained before, the reconciliation of the cache only is an additional option on retrieving supplementary results from the database but is not restricted to be performed when supplementary results are demanded by a current or follow-up request.

In another example, the current or a follow-up request demands to retrieve one or more supplementary results from the database 102 beyond the one or more results already stored in the representation 105 of the cache 101. Therewith, the cache 101 retrieves in any case a different or no result than already stored in the representation 105. Then the probability to remain unchanged over time for the different result is compared to the probability of the result already stored in the cache 101. Where the probability of the supplementary result is equal or lower the probability of the result already stored in the representation 105 of the cache 101, the result is not updated. Otherwise, the already stored result in the cache 101 having the lower probability to remain unchanged is replaced by the supplementary result having a higher probability to remain unchanged in a reconciliation of the cache 101. Also, changes in the parameters of a result may be updated. If no supplementary result is retrieved from the database 102, in this example, this only means that the database does not output additional results beyond the results already stored in the cache 101. Since it is indistinguishable for the cache 101 if there is no result at all for the request to be retrieved from the database 102 anymore, or if there is only no supplementary result, this means that it is also indistinguishable for the cache 101 if the result already stored may be removed by an update. Hence, in this example, the cache 101 maintains or replaces results stored in the cache 101 and/or parameters of the results but does not remove results from the cache 101 in the reconciliation of the cache 101.

In another example, the current or follow-up request demands to retrieve one or more supplementary results 704 in order to check the validity of the returned result 703. This is, for example, an option in situations where the cache is updated periodically in order to trigger an intermediate update only in regard to the current request. A reconciliation of the cache 101 using the one or more supplementary results retrieved from the database 102 then maintains the result in the cache 101, where the supplementary results have an equal or lower probability to remain unchanged. The reconciliation updates the cache 101, where the probability of the supplementary results is higher. The reconciliation removes the results stored in the cache 101, where no supplementary results are retrieved from the database 102. The reconciliation updates parameters of the results that have changed in the meantime.

Updating the cache 101 based on the probability that the results in the representation 105 of the cache 101 remain valid over time provides that, in response to receiving a database request from a client 103, reliable results are returned to the client 103 which are consistent with high probability with results outputted from the data space 106 of the database 102 in the database system 100. Additionally, this minimizes the number of updates of the cache 101 as already explained before.

Figure 10:
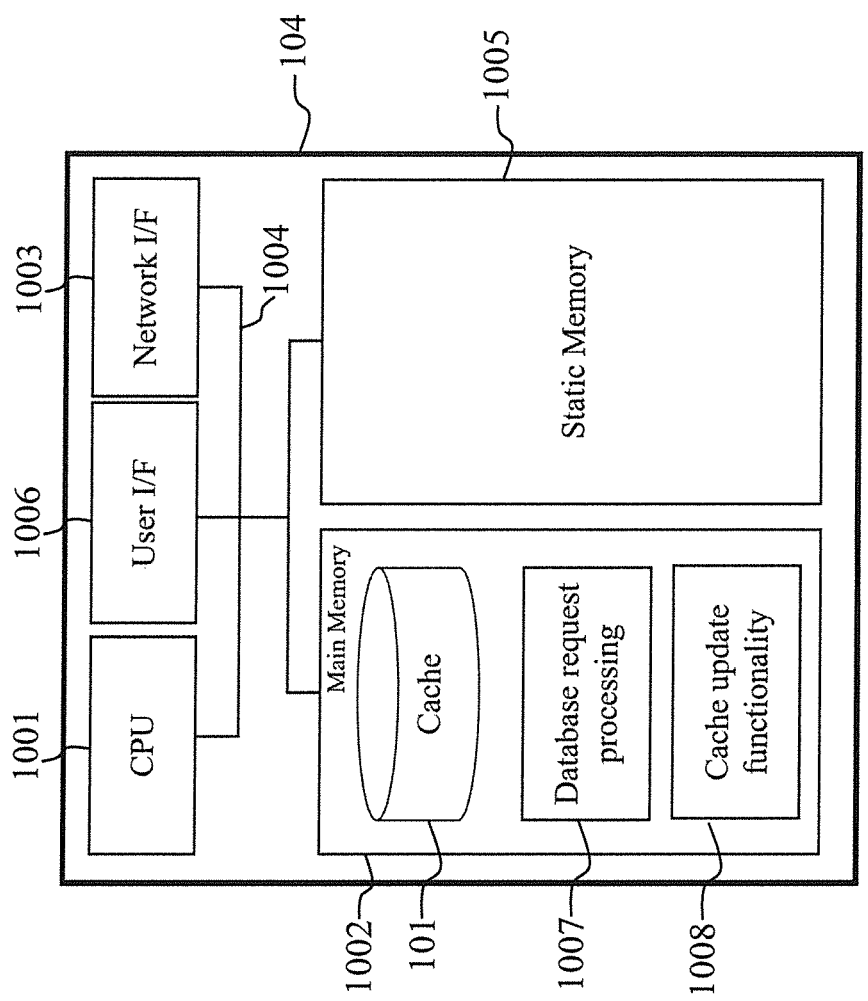
FIG. 10 is an exemplary schematic view of the internal architecture of the computing machine.

FIG. 10 is a diagrammatic representation of the internal component of a computing machine 104. The computing machine 104 includes a set of instructions to cause the computing machine 104 to perform any of the methodologies discussed herein when executed by the computing machine 104. The computing machine 104 includes one or more processors 1001, a main memory 1002 and a network interface device 1003 which communicate with each other via a bus 1004. Optionally, the computing machine 104 may further include a static memory 1005 and a disk-drive unit. A video display, an alpha-numeric input device and a cursor control device may be provided as examples of user interface 1006. The network interface device 1003 connects the computing machine 104 at least to the clients 103 as well as to the databases 102 of the database system 100.

In embodiments in which the computing machine 104 also hosts the cache 101, the cache 101 may be kept in the main memory 1002. A set of computer-executable instructions (i.e., computer program code) embodying any one, or all, of the methodologies described above, resides completely, or at least partially, in or on a machine-readable medium, e.g., the main memory 1002 (shown as functional entities database request processing 1007 including the functionality to receive and process database requests including determination operation and cache update functionality 1008 and/or the one or more processors 1001 and/or in the static memory 1005. The instructions may further be transmitted or received as a propagated signal via the Internet through the network interface device 1003. Basic operation of the computing machine 104 including user interface and network communication is controlled by an operating system which is also located in the main memory 1005, the one or more processors 1001 and/or the static memory 1005.

In general, the routines executed to implement the embodiments of the invention, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts and/or sequence diagrams.

The terminology used herein is for the purpose of describing particular embodiments only and is not intended to be limiting of the embodiments of the invention. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A method for processing data retrieval requests to retrieve database results from a cache of a database system, the cache storing a representation of a data space of at least one database of the database system, the data space being formed by data stored by the at least one database, the representation being a transformation and/or a subset of the data space to comprise at least one preprocessed result for any data retrieval request for which the data space of the at least one database of the database system is able to output a result, the method comprising, at the cache:

in response to receiving a data retrieval request from a client device, determining, by utilizing the stored representation, whether the data space of the at least one database is able to output at least one result for the data retrieval request;

if affirmative, returning at least one preprocessed result from the representation stored by the cache for the data retrieval request to the client device; and otherwise, returning an invalidity notification to the client device without referring to the at least one database, wherein the representation comprises fewer preprocessed results for the received data retrieval request than the data space of the at least one database of the database system is able to output for the received data retrieval request, the fewer preprocessed results forming a result subspace, wherein the result subspace is based on a probability that the preprocessed results in the representation of the cache remain valid over time, the preprocessed results in the representation of the cache being associated with an indicator indicating the probability of remaining valid over time.

2. The method of claim 1, wherein the representation comprises a number of data records, each data record comprising a key-value combination, wherein the data retrieval request comprises a key of at least one data record and the at least one preprocessed result for the data retrieval request comprises at least one value of the at least one data record.

3. The method of claim 2, wherein the key-value combination represents a connection path between an origin node and a destination node in a communication network, wherein the key specifies the origin node and the destination node in the communication network and the value is at least one path from the origin node to the destination node, and wherein the origin node is connected directly or via at least one intermediate node to the destination node.

4. The method of claim 3, further comprising:
in response to returning the invalidity notification to the received data retrieval request, accumulating a number of occurrences of the data retrieval request for which the invalidity notification is returned; and
optimizing the communication network in response to determining that the accumulated number of occurrences exceeds a predefined threshold.

5. The method of claim 1, wherein the representation comprises at least two preprocessed results for the data retrieval request, wherein returning the at least one preprocessed result for the data retrieval request from the representation of the cache comprises returning at least one of the at least two preprocessed results having the indicator indicating the highest probability of remaining valid over time.

6. The method of claim 1, further comprising:
retrieving one or more additional results from the at least one database of the database system; and
returning the one or more additional results in addition to the result returned from the representation of the cache.

7. The method of claim 6, further comprising:
updating the representation of the cache with the one or more additional results.

8. The method of claim 7, further comprising:
updating the cache based on the probability that the preprocessed results in the representation of the cache remain valid over time given by the indicator.

9. The method of claim 8, wherein updating the cache further comprises:
replacing a first preprocessed result of the representation by a second preprocessed result for the same data retrieval request in response to determining that the indicator of the second preprocessed result indicates a higher probability to remain valid over time than the indicator of the first preprocessed result.

10. A system comprising:
a database system including a database and a cache storing a representation of at least one data space of the database, the data space being formed by data stored by the at least one database, the representation being a transformation and/or a subset of the data space to comprise at least one preprocessed result for any data retrieval request for which the data space of the at least one database of the database system is able to output a result, and the cache configured to:
receive a data retrieval request from a client device;
in response to receiving the data retrieval request, determine, by utilizing the stored representation, whether the data space of the at least one database is able to output at least one result for the data retrieval request,
if affirmative, return at least one preprocessed result from the representation stored by the cache for the data retrieval request to the client device; and
otherwise, returning an invalidity notification to the client device without referring to the at least one database,
wherein the representation comprises fewer preprocessed results for the received data retrieval request than the data space of the at least one database of the database system is able to output for the received data retrieval request, the fewer preprocessed results forming a result subspace, wherein the result subspace is based on a probability that the preprocessed results in the representation of the cache remain valid over time, the preprocessed results in the representation of the cache being associated with an indicator indicating the probability of remaining valid over time.

11. The system of claim 10, wherein the representation comprises a number of data records, each data record comprising a key-value combination, wherein the data retrieval request comprises a key of at least one data record and the at least one preprocessed result for the data retrieval request comprises at least one value of the at least one data record.

12. The system of claim 11, wherein the key-value combination represents a connection path between an origin node and a destination node in a communication network, wherein the key specifies the origin node and the destination node in the communication network and the value is at least one path from the origin node to the destination node, and wherein the origin node is connected directly or via at least one intermediate node to the destination node.

13. The system of claim 12, wherein the cache is further configured to:
in response to returning the invalidity notification to the received data retrieval request, accumulate a number of occurrences of the data retrieval request for which the invalidity notification is returned; and
optimize the communication network in response to determining that the accumulated number of occurrences exceeds a predefined threshold.

14. The system of claim 10, wherein the representation comprises at least two preprocessed results for the data retrieval request, wherein returning the at least one preprocessed result for the data retrieval request from the representation of the cache comprises returning at least one of the at least two preprocessed results having the indicator indicating the highest probability of remaining valid over time.

15. The system of claim 10, further comprising:
retrieving one or more additional results from the at least one database of the database system; and
returning the one or more additional results in addition to the result returned from the representation of the cache.

16. The system of claim 15, wherein the cache is further configured to:
update the representation of the cache with the one or more additional results.

17. The system of claim 16, wherein the cache is further configured to:

update the cache based on the probability that the preprocessed results in the representation of the cache remain valid over time given by the indicator.

18. The system of claim 17, wherein, to update the cache, a first preprocessed result of the representation is replaced by a second preprocessed result for the same data retrieval request in response to determining that the indicator of the second preprocessed result indicates a higher probability to remain valid over time than the indicator of the first preprocessed result.

19. A non-transitory computer readable medium storing instructions which, when executed by a computing device for processing data retrieval requests to retrieve database results from a cache of a database system, the cache storing a representation of a data space of at least one database of the database system, the data space being formed by data stored by the at least one database, the representation being a transformation and/or a subset of the data space to comprise at least one preprocessed result for any data retrieval request for which the data space of the at least one database of the database system is able to output a result, cause the computing device to:

in response to receiving a data retrieval request from a client device, determine, by utilizing the stored representation, whether the data space of the at least one database is able to output at least one result for the data retrieval request;

if affirmative, return at least one preprocessed result from the representation stored by the cache for the data retrieval request to the client device; and otherwise, return an invalidity notification to the client device without referring to the at least one database, wherein the representation comprises fewer preprocessed results for the received data retrieval request than the data space of the at least one database of the database system is able to output for the received data retrieval request, the fewer preprocessed results forming a result subspace, wherein the result subspace is based on a probability that the preprocessed results in the representation of the cache remain valid over time, the preprocessed results in the representation of the cache being associated with an indicator indicating the probability of remaining valid over time.

* * * * *